US012785281B2

(12) United States Patent
Lee et al.

(10) Patent No.: US 12,785,281 B2
(45) Date of Patent: Nov. 3, 2026

(54) ANTENNA DEVICE, ANTENNA STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Won Hee Lee, Jeollabuk-do (KR); Ki Hun Sung, Jeollabuk-do (KR); Sung Joon Hong, Jeollabuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 140 days.

(21) Appl. No.: 18/899,070

(22) Filed: Sep. 27, 2024

(65) Prior Publication Data

US 2025/0105524 A1 Mar. 27, 2025

(30) Foreign Application Priority Data

Sep. 27, 2023 (KR) ........................ 10-2023-0129971

(51) Int. Cl.

*H01Q 13/08* (2006.01)
*H01Q 9/04* (2006.01)
*H01Q 21/06* (2006.01)

(52) U.S. Cl.

CPC ........... *H01Q 13/08* (2013.01); *H01Q 9/0407* (2013.01); *H01Q 21/065* (2013.01)

(58) Field of Classification Search

CPC .... H01Q 13/08; H01Q 9/0407; H01Q 21/065; H01Q 21/08; H01Q 5/378; H01Q 1/243; H01Q 1/38; H01Q 5/28; H01Q 1/48; H04M 1/0266

See application file for complete search history.

(56) References Cited

U.S. PATENT DOCUMENTS

| | | | | |
|---|---|---|---|---|
| 4,540,988 A * | 9/1985 | Munk | H01Q 3/247 | 343/789 |
| 11,569,585 B2 * | 1/2023 | Li | H01Q 21/06 | |
| 11,824,282 B2 * | 11/2023 | Lee | H01Q 1/243 | |
| 2009/0046029 A1 * | 2/2009 | Nagai | H01Q 9/045 | 343/700 MS |

(Continued)

FOREIGN PATENT DOCUMENTS

| | | | | |
|---|---|---|---|---|
| CN | 119495934 B * | 10/2025 | H01Q 1/42 |
| JP | H10-98329 A | 4/1998 | |

(Continued)

OTHER PUBLICATIONS

Office action issued on Jul. 22, 2025 from Japan Intellectual Property Office in a counterpart Japanese Patent Application No. 2024-168733 (all the cited references are listed in this IDS.) (English translation is also submitted herewith.).

*Primary Examiner* — Dameon E Levi
*Assistant Examiner* — Jordan E. DeWitt
(74) *Attorney, Agent, or Firm* — The PL Law Group, PLLC

(57) ABSTRACT

An antenna device includes a radiator, a transmission line connected to the radiator and an auxiliary radiator disposed between the first transmission line and the second transmission line to be spaced apart from the radiator. The transmission line includes a first transmission line and a second transmission line facing each other. An image display device includes the antenna device, and a display panel and a circuit board which are electrically connected to the antenna device.

16 Claims, 15 Drawing Sheets

(56) References Cited

U.S. PATENT DOCUMENTS

2009/0207092 A1* 8/2009 Nysen .................... H01Q 21/28
343/893
2009/0256777 A1* 10/2009 Nagai .................. H01Q 9/0407
343/893
2017/0244162 A1* 8/2017 Toyao .................... H01Q 21/30
2020/0203848 A1* 6/2020 Tarng ....................... H01Q 9/30
2020/0395669 A1* 12/2020 Forslund .................. H01Q 5/25
2021/0151885 A1* 5/2021 Lyu .......................... H01Q 9/42
2022/0190469 A1* 6/2022 Kim ......................... H01Q 1/22
2022/0216596 A1* 7/2022 Ryu ..................... H01Q 1/2291
2022/0247083 A1* 8/2022 Kim ....................... H01Q 21/24
2022/0285840 A1* 9/2022 Lee .......................... H01Q 1/44
2022/0416410 A1* 12/2022 Kim ..................... H01Q 1/2283
2023/0006349 A1* 1/2023 Lee ........................ H01Q 21/24
2023/0018267 A1* 1/2023 Kim ....................... H01Q 1/241
2023/0052259 A1* 2/2023 Choi ........................ H05K 1/02
2023/0098313 A1* 3/2023 Lee ........................ H01Q 1/243
343/846
2023/0141980 A1* 5/2023 Tsai ....................... H01Q 5/378
343/893
2023/0163457 A1* 5/2023 Tsai ....................... H01Q 1/243
343/893
2023/0387594 A1* 11/2023 Wu ........................ H01Q 5/335
2023/0422409 A1* 12/2023 Kim ..................... H01Q 1/2283
2024/0154299 A1* 5/2024 Yoon ...................... H01Q 1/243
2024/0195070 A1* 6/2024 Sung ........................ H01Q 1/52
2024/0266756 A1* 8/2024 Choi ........................ H01Q 1/48
2025/0015490 A1* 1/2025 Li .......................... H01Q 1/521
2025/0105524 A1* 3/2025 Lee ........................ H01Q 5/378
2025/0123704 A1* 4/2025 Kwon ................. G06F 3/04164
2025/0316899 A1* 10/2025 Hong ....................... H01Q 1/48
2026/0045684 A1* 2/2026 Komura ................. H01Q 1/523
2026/0196729 A1* 7/2026 Wu ........................ H01Q 1/243

FOREIGN PATENT DOCUMENTS

JP 2022-99596 A 7/2022
JP 2023-510664 A 3/2023
JP 2023-59266 A 4/2023
KR 10-2016-0059291 A 5/2016
KR 10-2390289 B1 4/2022
WO WO-2024262167 A1 * 12/2024 ............. H01Q 21/08

* cited by examiner

ANTENNA DEVICE, ANTENNA STRUCTURE INCLUDING THE SAME AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2023-0129971, filed on Sep. 27, 2023, in the Korean Intellectual Property Office, the entire disclosure of which is incorporated herein by reference for all purposes.

BACKGROUND

1. Technical Field

The present invention relates to an antenna device, an antenna structure including the same, and an image display device including the same.

2. Background Art

As information technologies have been developed, a wireless communication technology such as Wi-Fi, Bluetooth, etc., is combined or embedded in an image display device as, e.g., a smart-phone form. In this case, an antenna may be combined with the image display device to provide a communication function.

As mobile communication technologies have been rapidly developed, a combination of an antenna capable of operating a high frequency or ultra-high frequency communication is needed in the image display device.

Additionally, as an image display device combined with the antenna becomes thinner and lighter, a space for occupying the antenna may be reduced. Accordingly, high-frequency and wideband signal transmission and reception may not be easily implemented in the limited space.

Thus, construction of an antenna capable of transmitting and receiving various signals in multiple bands in the limited space may be needed.

SUMMARY

According to an aspect of the present invention, there is provided an antenna device having improved radiation property.

According to an aspect of the present invention, there is provided an antenna structure including an antenna device having improved radiation property.

According to an aspect of the present invention, there is provided an image display device including an antenna device having improved radiation property.

(1) An antenna device, including: a radiator; a transmission line connected to the radiator, the transmission line including a first transmission line and a second transmission line facing each other; and an auxiliary radiator disposed between the first transmission line and the second transmission line to be spaced apart from the radiator.

(2) The antenna device according to the above (1), wherein the first transmission line and the second transmission line are connected to both lateral ends of a lower side of the radiator.

(3) The antenna device according to the above (1), wherein the first transmission line and the second transmission line extend in different directions from the radiator.

(4) The antenna device according to the above (1), wherein the auxiliary radiator includes an extension portion parallel to a lower side of the radiator, and a connection portion branching from the extension portion and extending in a direction perpendicular to the extension portion.

(5) The antenna device according to the above (4), wherein an extension direction of the first transmission line and an extension direction of the second transmission line are symmetrical with respect to an extension direction of the connection portion.

(6) The antenna device according to the above (1), wherein the auxiliary radiator includes a first auxiliary radiator and a second auxiliary radiator facing each other.

(7) The antenna device according to the above (6), the first auxiliary radiator includes a first extension portion parallel to a lower side of the radiator, and a first connection portion extending in a direction perpendicular to the first extension portion from an end portion of the first extension portion, and the second auxiliary radiator includes a second extension portion spaced apart from the first extension portion and parallel to the lower side of the radiator, and a second connection portion extending in a direction perpendicular to the second extension portion from an end portion of the second extension portion.

(8) The antenna device according to the above (6), wherein the first auxiliary radiator and the second auxiliary radiator have a symmetrical shape with respect to a virtual line passing through a center of the radiator in a length direction.

(9) The antenna device according to the above (1), wherein the radiator includes a mesh structure, and the transmission line and the auxiliary radiator include a solid structure.

(10) An antenna structure, including: the above-described antenna device, and a circuit board electrically connected to the antenna device.

(11) The antenna structure according to the above (10), wherein the circuit board includes a core layer, and signal wirings arranged on one surface of the core layer and connected to the first transmission line and the second transmission line.

(12) The antenna structure according to the above (11), wherein the circuit board further includes a first ground arranged at the same layer as that of the signal wiring and disposed around the signal wiring to be spaced apart from the signal wiring.

(13) The antenna structure according to the above (12), wherein the auxiliary radiator is connected to the first ground.

(14) The antenna structure according to the above (11), wherein the circuit board further includes a second ground arranged on the other surface opposing the one surface of the core layer.

(15) The antenna structure according to the above (11), wherein the antenna device further includes a signal pad connected to the transmission line and bonded to the signal wiring.

(16) The antenna structure according to the above (15), wherein the antenna device further includes a ground pad arranged around the signal pad to be spaced apart from the signal pad.

(17) An image display device, including: a display panel; and the above-described antenna structure.

An antenna device according to embodiments of the present invention may include a first transmission line and a second transmission line connected to a radiator to face each other. Accordingly, two polarization directions (dual polarization) may be provided in one radiator.

In example embodiments, the antenna device may include an auxiliary radiator disposed between the first transmission line and the second transmission, and spaced apart from the radiator. A radiation in a resonance frequency band of about 35 GHz or more, or from about 36 GHz to about 40 GHz may be implemented through the auxiliary radiator.

In an embodiment, a radiation in a resonance frequency band of about 28 GHz or more may be implemented through the radiator, and a radiation in a resonance frequency band of about 35 GHz or more or from about 36 GHz to about 40 GHz may be implemented through the auxiliary radiator. Accordingly, signal transmission and reception may be implemented in two bands (dual bands).

DETAILED DESCRIPTION OF THE EMBODIMENTS

Embodiments of the present invention provide an antenna device including a radiator. According to example embodiments, an antenna structure including the antenna device and a circuit board is also provided. Addition, an image display device including the antenna device is provided.

The antenna device may be, e.g., a microstrip patch antenna fabricated in the form of a transparent film. The antenna device may be applied to, e.g., a communication device for a high-frequency or an ultra-high-frequency (e.g., 3G, 4G, 5G or more) mobile communication. However, the application of the antenna device is not limited to the image display device, and the antenna device may be applied to various structures such as vehicles, home appliances, architecture, buildings, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first," "second," "one surface," "the other surface," "one end," "the other end," "upper," "lower," "top," "bottom," herein are used to relatively distinguish positions of components, and are not intended to designate absolute positions.

Figure 1:
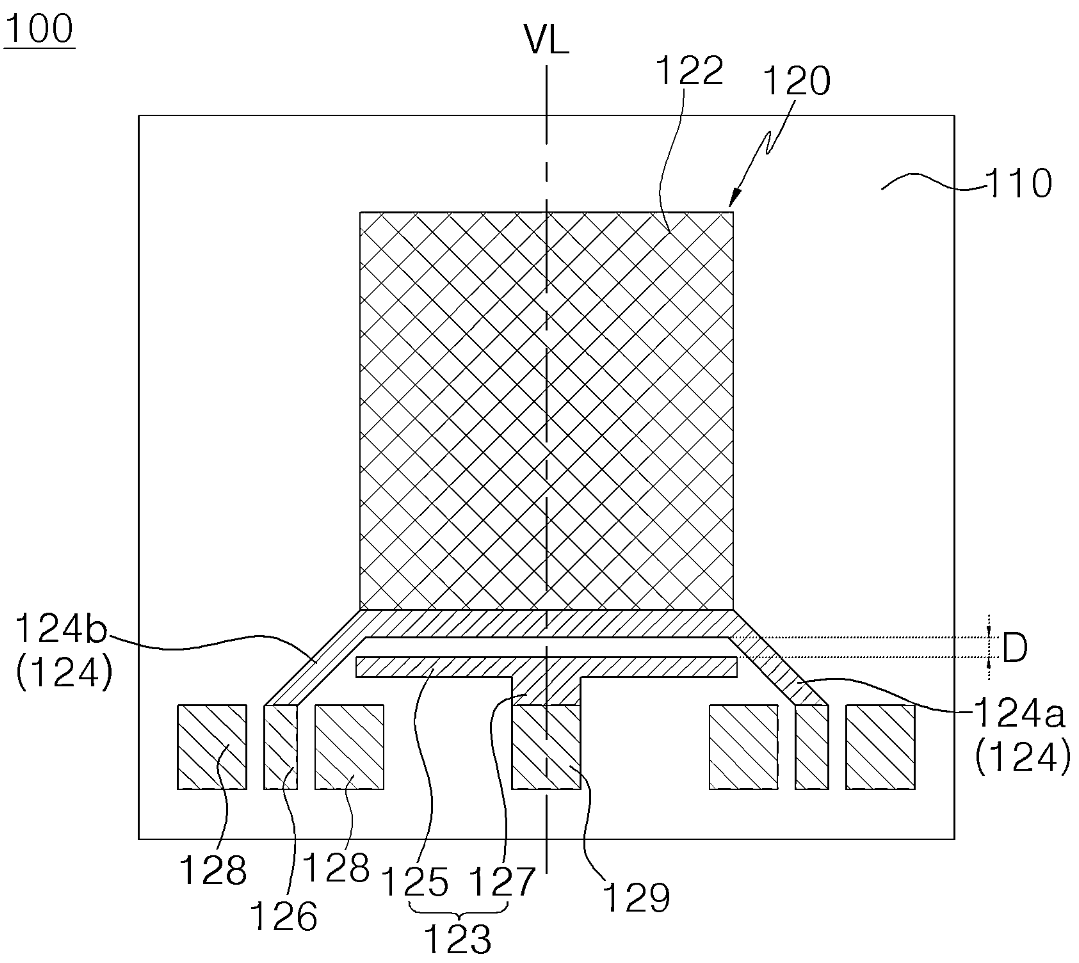
FIG. 1 is a schematic plan view illustrating an antenna device in accordance with example embodiments.

FIG. 1 is a schematic plan view illustrating an antenna device in accordance with example embodiments.

Referring to FIG. 1, an antenna device 100 may include a first dielectric layer 110 and an antenna unit 120 disposed on the first dielectric layer 110.

The first dielectric layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination thereof.

In some embodiments, the first dielectric layer 110 may include an adhesive film such as an optically clear adhesive (OCA), an optically clear resin (OCR), etc.

In some embodiments, the first dielectric layer 110 may include an inorganic insulating material such as glass, silicon oxide, silicon nitride, silicon oxynitride, etc.

In an embodiment, the first dielectric layer 110 may be provided as a substantially single layer.

In an embodiment, the first dielectric layer 110 may have a multi-layered structure of at least two layers. For example, the first dielectric layer 110 may include a substrate layer and a dielectric layer, and may include an adhesive layer between the substrate layer and the dielectric layer.

Impedance or inductance for the antenna unit 120 may be generated by the first dielectric layer 110, so that a frequency band at which the antenna structure may be driven or operated may be adjusted. In some embodiments, a dielectric constant of the first dielectric layer 110 may be adjusted in a range from about 1.5 to about 12. When the dielectric constant exceeds about 12, a driving frequency may be excessively decreased, so that driving in a desired high frequency band may not be implemented.

In example embodiments, the antenna unit 120 may include a radiator 122 and a transmission line 124 connected to the radiator 122. The transmission line 124 may extend from the radiator 122.

For example, the radiator 122 may have a polygonal plate shape, and the transmission line 124 may have a width smaller than that of the radiator 122 and may be connected to one end portion or one side of the radiator 122. The radiator 122 and the transmission line 124 may be formed as a single member integrally connected to each other.

A target resonance frequency of the antenna device 100 may be adjusted according to a shape/size of the radiator

122. In a non-limiting embodiment, the radiator 122 may be designed to be radiated in a high frequency/ultra-high frequency band of 3G, 4G, 5G or more. For example, a radiation in a frequency band of 0.5 GHz or more, 1 GHz or more, 10 GHz or more, 20 GHz or more, 30 GHz or more, or 40 GHz or more may be implemented from the radiator 122.

For example, the radiator 122 may be provided as a high frequency band radiation portion of the antenna unit 120. In an embodiment, the resonance frequency of the radiator 122 may be about 28 GHz or more.

The transmission line may include a first transmission line 124*a* and a second transmission line 124*b* connected to the radiator 122 to face each other. Accordingly, two polarization directions (dual polarization) may be implemented in a single radiator.

In some embodiments, each of the first transmission line 124*a* and the second transmission line 124*b* may be connected to both lateral ends of a lower side of the radiator 122 (e.g., both vertices of the lower side of the radiator 122). For example, at least a portion of the radiator 122 and the transmission line 124 may be formed as a single member integrally connected to each other.

The first transmission line 124*a* and the second transmission line 124*b* may extend from the radiator 122 in different directions. Accordingly, dual polarization properties may be realized from one radiator 122.

In some embodiments, an angle formed by extending directions of the first transmission line 124*a* and the second transmission line 124*b* may be about 90°. For example, the extending directions of the first transmission line 124*a* and the second transmission line 124*b* may be orthogonal to each other. In an embodiment, the first transmission line 124*a* and the second transmission line 124*b* may each extend in a direction passing through a center of the radiator 122.

Accordingly, the radiator 122 may be fed in two substantially orthogonal directions through the first transmission line 124*a* and the second transmission line 124*b*. For example, both vertical radiation and horizontal radiation may be implemented from the radiator 122.

In some embodiments, the first transmission line 124*a* and the second transmission line 124*b* may be arranged symmetrically to each other. For example, the first transmission line 124*a* and the second transmission line 124*b* may be arranged symmetrically with respect to a virtual line VL passing through the center of the radiator 122 in a length direction. Accordingly, signal strengths in two polarization directions may become substantially uniform.

In example embodiments, the antenna unit 120 may include an auxiliary radiator 123 disposed between the first transmission line 124*a* and the second transmission line 124*b* to be spaced apart from the radiator 122. For example, the auxiliary radiator 123 may be driven through a coupling with the radiator 122 and/or an electric field of the transmission line 124.

For example, the auxiliary radiator 123 may be provided as an ultra-high frequency band radiation portion of the antenna unit 120. For example, a radiation in a resonance frequency band of about 35 GHz or more, or from about 36 GHz to about 40 GHz may be implemented through the auxiliary radiator 123.

In an embodiment, a radiation in a resonance frequency band of about 28 GHz or more may be implemented through the radiator 122, and a radiation in a resonance frequency band of about 35 GHz or more, or from about 36 GHz to about 40 GHz may be implemented through the auxiliary radiator 123. Accordingly, signal transmission and reception may be implemented in two bands (dual bands).

For example, a current direction at a lower end of the radiator 122 may be guided to the center of the radiator 122 by the auxiliary radiator 123. Accordingly, an amount of an offset current of the radiator 122 may be reduced, and thus a double band-double polarization antenna may be realized.

In some embodiments, the auxiliary radiator 123 may include an extension portion 125 extending to be parallel to the lower side of the radiator 122, and a connection portion 127 branching from the extension portion 125 and extending in a direction perpendicular to the extension portion 125.

For example, the extension portion 125 may be adjacent to the lower side of the radiator 122 between the first transmission line 124*a* and the second transmission line 124*b*, and the connection portion 127 may be branched from a central portion of the extension portion 125. In an embodiment, the auxiliary radiator 123 may have a T-shape.

For example, the extension portion 125 and the connection portion 127 may be formed as a single member integrally connected to each other.

For example, each of the extension portion 125 and the connection portion 127 may have a bar shape.

For example, the shape and position of the extension portion 125 and the connection portion 127 may be adjusted in consideration of the ultra-high frequency band radiation as described above.

In some embodiments, a shortest distance D between the radiator 122 and the auxiliary radiator 123 may be in a range from about 0.5 μm to about 10 μm. For example, the shortest distance D between the lower side of the radiator 122 and an upper side of the extension portion 125 of the auxiliary radiator 123 may be in a range from about 0.5 μm to about 10 μm. In the above range, the auxiliary radiator 123 may be coupled to the radiator 122 to sufficiently implement the double-band radiation while further suppressing noise generation and deterioration of isolation.

In some embodiments, an extension direction of the first transmission line 124*a* and an extension direction of the second transmission line 124*b* may be symmetric with respect to an extension direction of the connection portion 127. Accordingly, signal strengths in two polarization directions may become substantially uniform while implementing the double-band radiation.

Figure 2:
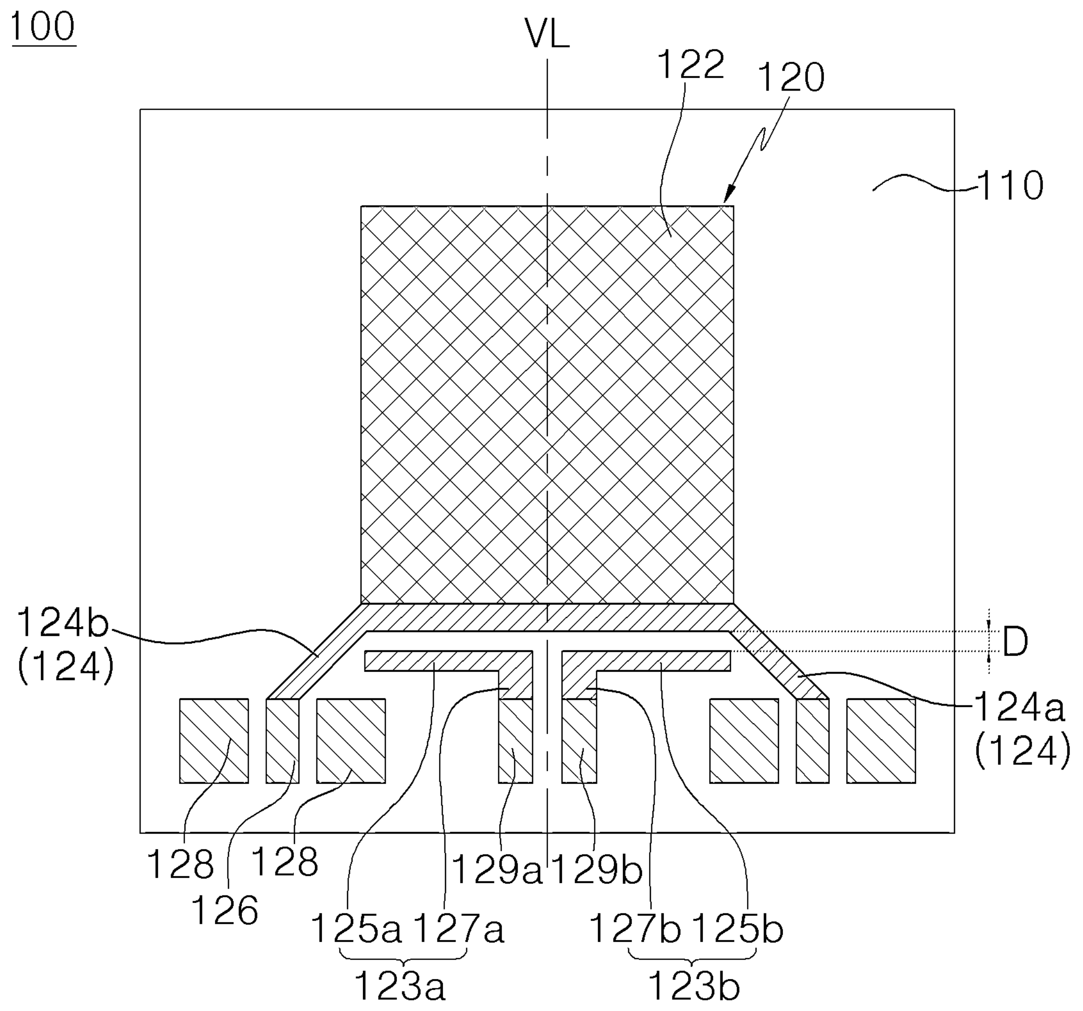
FIG. 2 is a schematic plan view illustrating an antenna device in accordance with example embodiments.

FIG. 2 is a schematic plan view illustrating an antenna device in accordance with example embodiments.

Referring to FIG. 2, the auxiliary radiator 123 may include a first auxiliary radiator 123*a* and a second auxiliary radiator 123*b* facing each other.

In some embodiments, the first auxiliary radiator 123*a* may include a first extension portion 125*a* parallel to the lower side of the radiator 122, and a first connection portion 127*a* extending in a direction perpendicular to the first extension portion 125*a* from an end portion of the first extension portion 125*a*.

In some embodiments, the second auxiliary radiator 123*b* may include a second extension portion 125*b* spaced apart from the first extension portion 125*a* and parallel to the lower side of the radiator 122, and a second connection portion 127*b* extending in a direction perpendicular to the second extension portion 125*b* from an end portion of the second extension portion 125*b*.

In some embodiments, the first auxiliary radiator 123*a* and the second auxiliary radiator 123*b* may have a symmetrical shape with respect to the virtual line VL penetrating the center of the radiator 122 in the length direction.

Accordingly, uniformity and stability of radiation properties in the ultra-high frequency band may be improved.

For example, the shape and position of the extension portions 125*a* and 125*b* and the connection portions 127*a* and 127*b* may be adjusted in consideration of the ultra-high frequency band radiation as described above.

In some embodiments, a signal pad 126 may be disposed at an end portion of the transmission line 124 of the antenna device 100. The signal pad 126 may be a single member substantially integral with the transmission line 124. In this case, the end portion of the transmission line 124 may serve as the signal pad 126.

For example, the radiator 122 and the signal pad 126 may be electrically connected through the transmission line 124.

A circuit board and the antenna unit 120 may be electrically connected through the signal pad 126. Accordingly, signal transmission and reception of an antenna driving integrated circuit (IC) chip of the circuit board and the radiator 122 may be implemented.

In some embodiments, the antenna unit 120 may further include a ground pad 128 spaced apart from the signal pad 126 and disposed around the signal pad 126. The ground pad 128 may be electrically and physically separated from the transmission line 124 and the signal pad 126. In an embodiment, a pair of the ground pads 128 may be disposed to face each other with the signal pad 126 interposed therebetween. Accordingly, noise generation from a signal transmitted through the signal pad 126 may be reduced.

In some embodiments, a connection pad 129 may be disposed at an end portion of the auxiliary radiator 123. The connection pad 129 may be a single member substantially integral with the auxiliary radiator 123. In this case, the end portion of the connection portion 127 of the auxiliary radiator 123 may serve as the connection pad 129.

In some embodiments, a first connection pad 129*a* may be disposed at an end portion of the first connection portion 127*a* of the first auxiliary radiator 123*a*, and a second connection pad 129*b* may be disposed at an end portion of the second connection portion 127*b* of the second auxiliary radiator 123*b*.

For example, the signal pad 126, the ground pad 128 and the connection pad 129 may be disposed in a bonding region BR to which the antenna device 100 and the circuit board are bonded.

For example, bonding stability of the antenna device 100 and the circuit board in the bonding region BR may be improved by the ground pad 128.

In an embodiment, the signal pad 126, the ground pad 128 and the connection 129 may include a solid structure. Accordingly, increase in resistance due to bonding at connected portions of the antenna device 100 and the circuit board 200 may be suppressed, and feeding efficiency may be enhanced.

Figure 3:
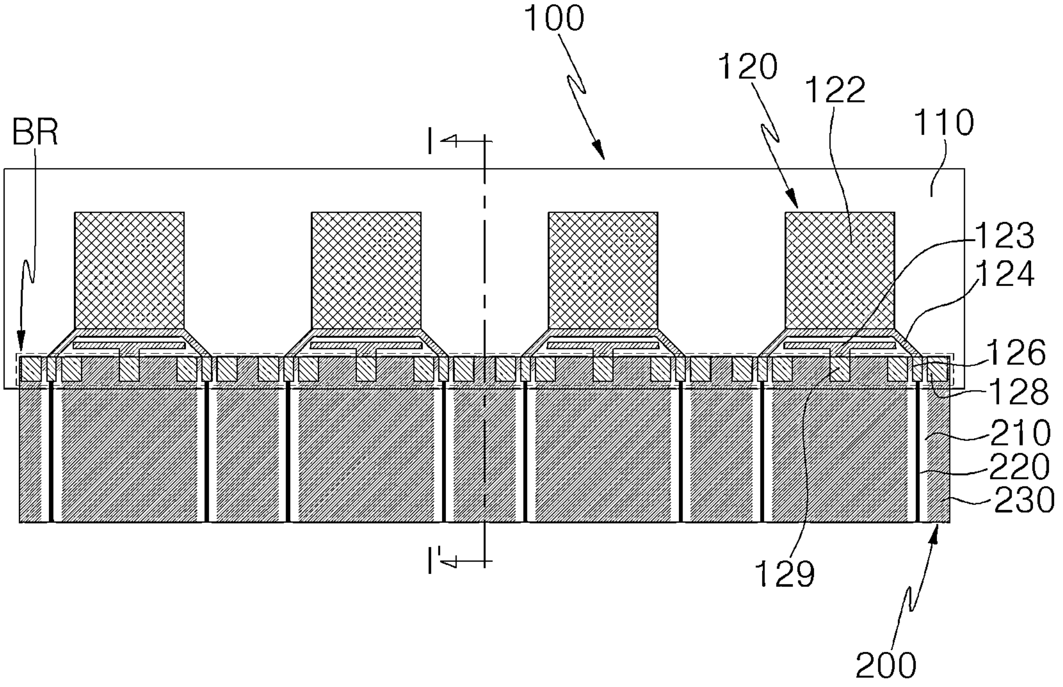
FIGS. 3 and 4 are schematic plan views illustrating an antenna structure in accordance with example embodiments.
Figure 4:
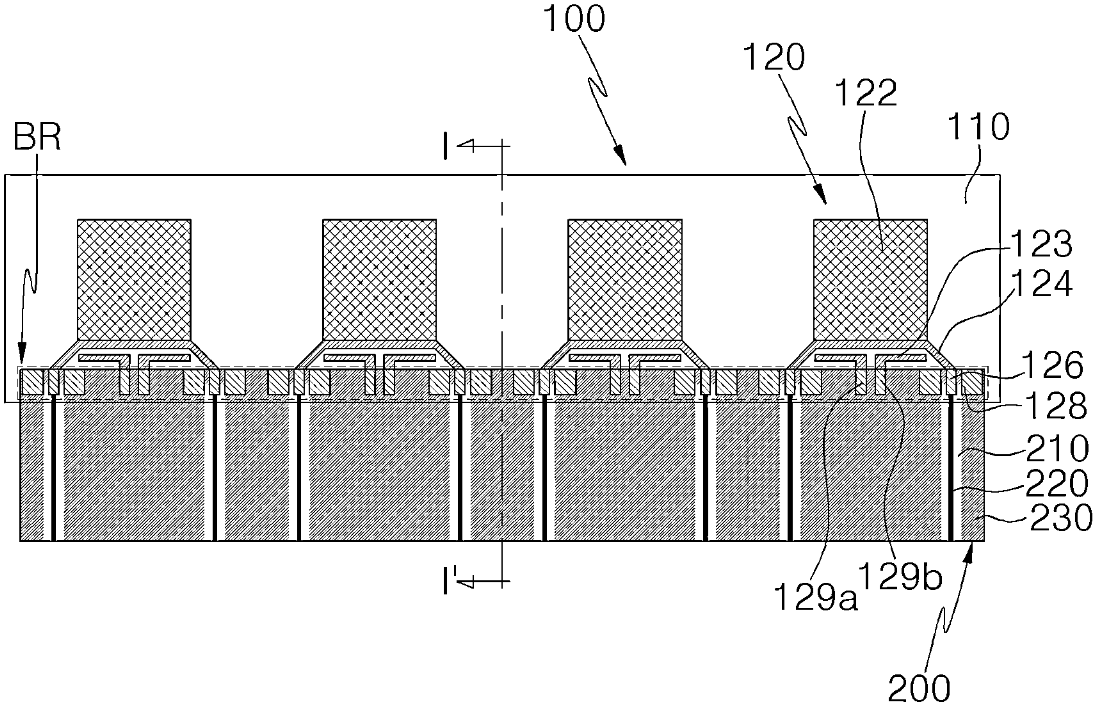

FIGS. 3 and 4 are schematic plan views illustrating an antenna structure in accordance with example embodiments. For example, FIG. 3 illustrates an antenna structure according to example embodiments in which the auxiliary radiator 123 is formed in a single conductive pattern, and FIG. 4 illustrates an antenna structure according to example embodiments in which the auxiliary radiator 123 includes the first auxiliary radiator 123*a* and the second auxiliary radiator 123*b*.

Figure 5:
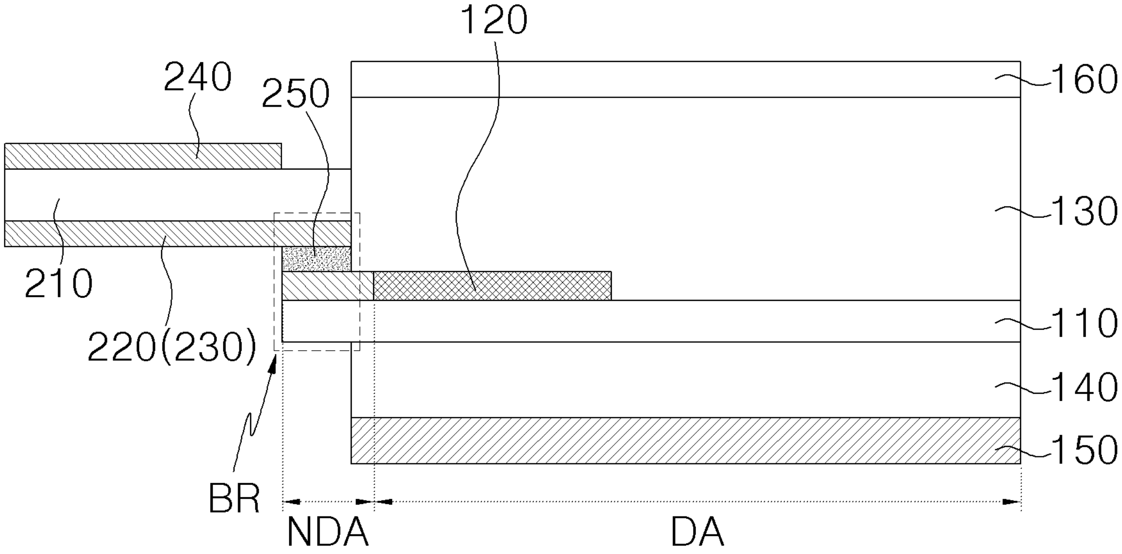
FIG. 5 is a schematic cross-sectional view illustrating an antenna structure in accordance with example embodiments.

FIG. 5 is a schematic cross-sectional view illustrating an antenna structure in accordance with example embodiments. For example, FIG. 5 is a cross-sectional view taken along a line I-I' of FIGS. 3 and 4 in a thickness direction.

Referring to FIGS. 3 to 5, the antenna structure may include the antenna device 100 and a circuit board 200 electrically connected to the antenna element device.

In some embodiments, the antenna device 100 may further include a second dielectric layer 130 disposed on the first dielectric layer 110 and the antenna unit 120. The second dielectric layer 130 may cover at least a portion of a top surface of the antenna unit 120. Accordingly, an impedance of the antenna unit 120 may be adjusted and the antenna unit 120 may be protected from an external impact.

In some embodiments, the antenna device 100 may further include a third dielectric layer 140 disposed under a bottom surface of the first dielectric layer 110.

In an embodiment, the second dielectric layer 130 and the third dielectric layer 140 may include the same type of material and/or stacked structure as those of the first dielectric layer 110.

In an embodiment, an antenna ground 150 may be disposed under a bottom surface of the first dielectric layer 110 and/or the third dielectric layer 140.

In an embodiment, a conductive member of an image display device or a display panel to which the antenna structure is applied may serve as the antenna ground 150.

For example, the conductive member may include electrodes or wirings such as a gate electrode, source/drain electrodes, a pixel electrode, a common electrode, data lines, scan lines, etc., included in a thin film transistor array panel.

In an embodiment, a metallic member such as an SUS plate, a sensor member such as a digitizer, a heat dissipation sheet which may be disposed at a rear portion of the image display device may serve as the antenna ground 150.

In an embodiment, the antenna device 100 may further include a protective layer 160 disposed on the second dielectric layer 130. The protective layer 160 may include substantially the same type of material as that of the dielectric layers 110, 120 and 130.

In an embodiment, the protective layer 160 may include a cover window. The cover window may include, e.g., an ultra-thin glass (UTG) or a transparent resin film. Accordingly, an external impact applied to the antenna device 100 may be reduced or alleviated.

The antenna unit 120 and/or the antenna ground 150 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer.

Corrosive resistance and transparency may be improved by the transparent conductive oxide layer.

The antenna unit 120 may include a blackened portion, so that a reflectance at a surface of the antenna unit 120 may be decreased to suppress a visual pattern recognition due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the radiator 122 may include a mesh structure, and the transmission line 124 and the auxiliary radiator 123 may include a solid structure. For example, at least a portion of the radiator 122 may be formed in a mesh structure, and a remaining portion may be formed in a solid structure.

In an embodiment, a lower portion of the radiator 122, the transmission line 124 and the auxiliary radiator 123 may be included in a non-display area NDA of the image display device, and may be formed to have the solid structure. In this case, a remaining portion of the radiator 122 may be included in a display area DA of the image display device and may be formed to have the mesh structure. Accordingly, signal transmission/reception efficiency may be improved while preventing the antenna unit 120 from being visually recognized by a user.

In example embodiments, the circuit board 200 may include a core layer 210 and a signal wiring 220 disposed on one surface of the core layer 210. In an embodiment, the circuit board 200 may include flexible printed circuit boards (FPCB).

For example, the core layer 210 may include a flexible resin such as a polyimide resin, a modified polyimide (MPI), an epoxy resin, a polyester, a cyclo olefin polymer (COP), a liquid crystal polymer (LCP), etc. In an embodiment, the core layer 210 may include the polyimide resin or the MPI.

In some embodiments, the signal wiring 220 may be connected to each of the first transmission line 124*a* and the second transmission line 124*b*. For example, one end portion of the signal wiring 220 may be bonded to the signal pad 126 so that the transmission line 124 and the signal wiring 220 may be connected. Accordingly, signal transmission and/or feeding between the antenna driving IC chip and the antenna unit 120 may be performed through the circuit board 200

In some embodiments, the circuit board 200 may include a first ground 230 disposed at the same layer or at the same level as that of the signal wiring 220.

The first ground 230 may be disposed around the signal wiring 220 to be spaced apart from the signal wiring 220 by a predetermined distance. Accordingly, noises around the signal wiring 220 may be blocked, and feeding concentration through the signal wiring 220 may be enhanced.

In some embodiments, the auxiliary radiator 123 of the antenna unit 120 may be electrically connected to the first ground 230 of the circuit board 200. Accordingly, sensitivity of signal transmission and reception in the ultra-high frequency band through the auxiliary radiator 123 may be improved and noises may be reduced.

As illustrated in FIG. 5, the antenna structure may further include a conductive intermediate structure 250 disposed between the antenna device 100 and the circuit board 200 in the bonding region BR. For example, the transmission line 124 and the circuit wiring 220, and/or the auxiliary radiator 123 and the first ground 230 may be bonded or adhered to each other by the conductive intermediate structure 250. For example, the antenna unit 120, the conductive intermediate structure 250 and the signal wiring 220/the first ground 230 may be sequentially contacted or stacked in the bonding region BR.

For example, the conductive intermediate structure 250 may be attached commonly to the signal pad 126, the ground pad 128 and the connection pad 129 of the antenna unit 120. Thereafter, end portions of the signal wiring 220 and the first ground 230 may be bonded onto the signal pad 126 and the connection pad 129, respectively, by heating/pressing processes. The ground pad 128 may serve as a bonding pad bonded to the first ground 230 to improve bonding stability, and may absorb noises around the signal pad 126 to discharge the noises through the first ground 230.

Accordingly, the signal wiring 220 and the transmission line 124 may be connected through the signal pad 126, and the first ground 230 and the auxiliary radiator 123 may be connected through the connection pad 129.

For example, the signal wiring 220 and the first ground 230 may be disposed together on one surface of the core layer 210.

In some embodiments, the circuit board 200 may further include a second ground 240 disposed on the other surface facing the one surface of the core layer 210. Accordingly, a concentration of a signal transmitted to the signal wiring 220 may be improved, and a vertical noise may be shielded.

In some embodiments, the signal wiring 220, the first ground 230 and/or the second ground 240 may include the same type of material as that of the antenna unit 120.

In an embodiment, a coverlay film for protecting the wiring and electrode layers may be disposed on the one surface and/or the other surface of the core layer 210.

Figure 6:
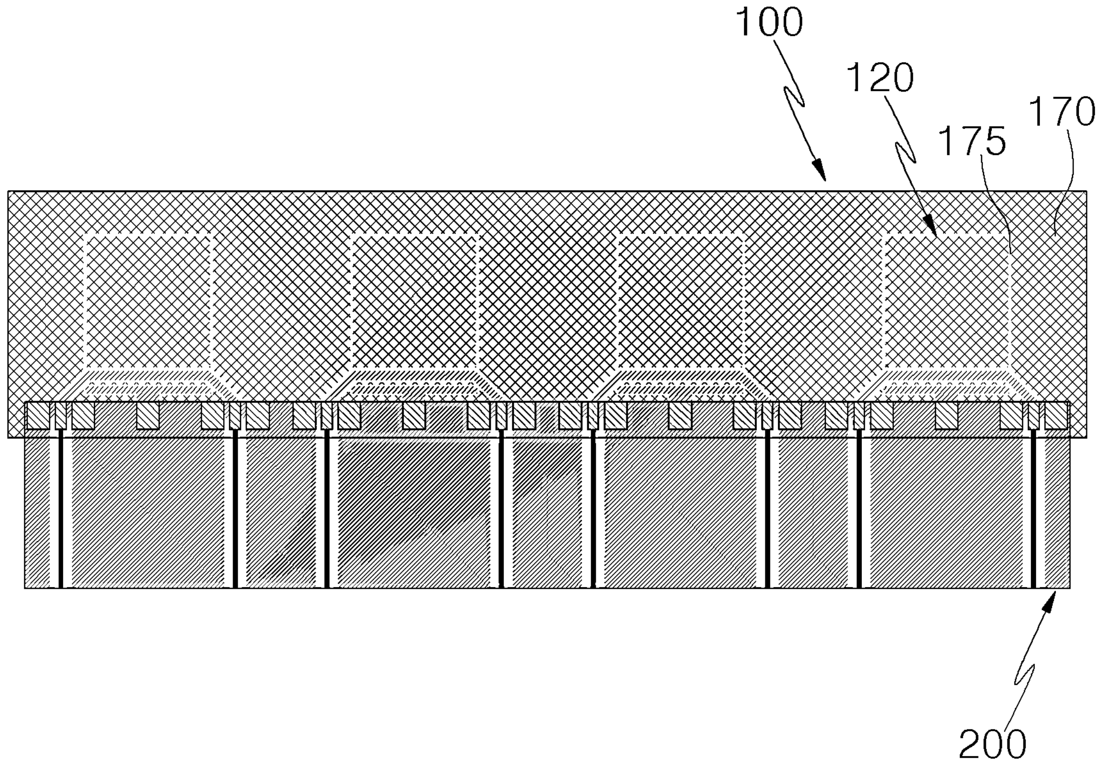
FIGS. 6 and 7 are schematic plan views illustrating an antenna structure in accordance with example embodiments.
Figure 7:
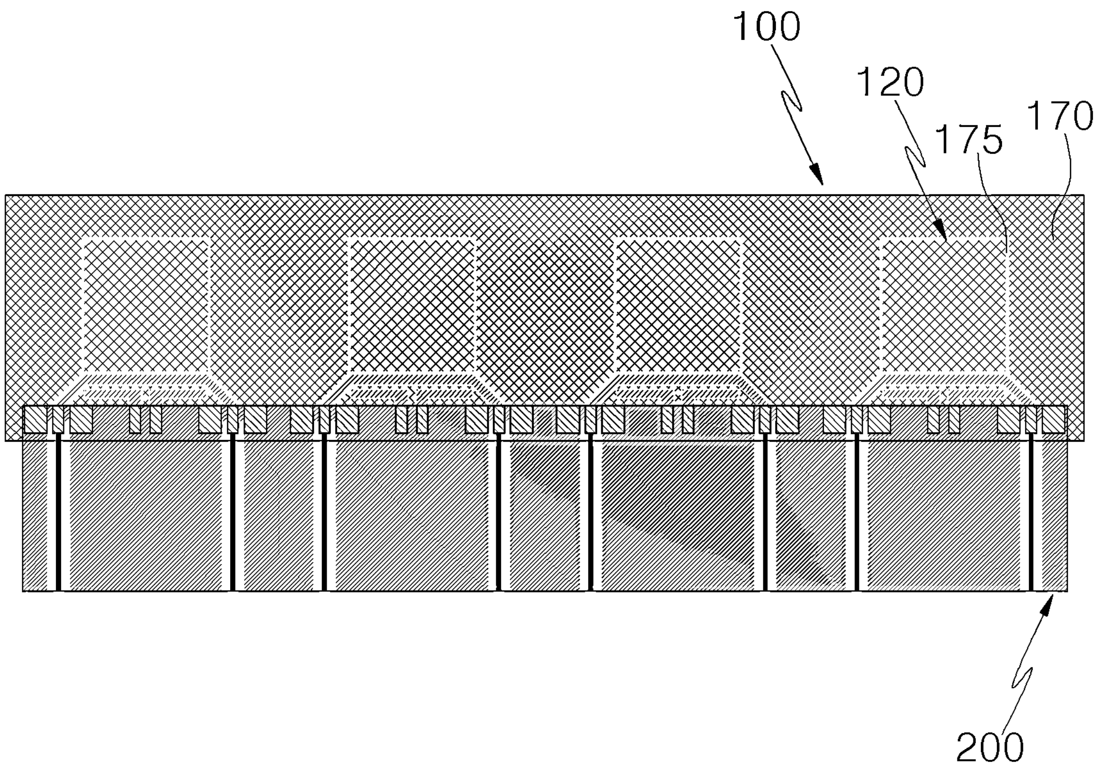

FIGS. 6 and 7 are schematic plan views illustrating an antenna structure in accordance with example embodiments.

Referring to FIGS. 6 and 7, a dummy mesh layer 170 may be disposed around the radiator 122, the transmission line 124 and the auxiliary radiator 123. The dummy mesh layer 170 may include a mesh structure substantially the same as the mesh structure included in the radiator 122. Accordingly, a spatial distribution of conductive patterns may become uniform in the display area DA of the image display device, so that visual recognition of the radiator 122 may be suppressed.

The dummy mesh layer 170 may be formed together with the radiator 122 by etching the same mesh layer. The dummy mesh layer 170 may be physically separated from the radiator 122, the transmission line 124 and the auxiliary radiator 123 by a separation region 175.

Figure 8:
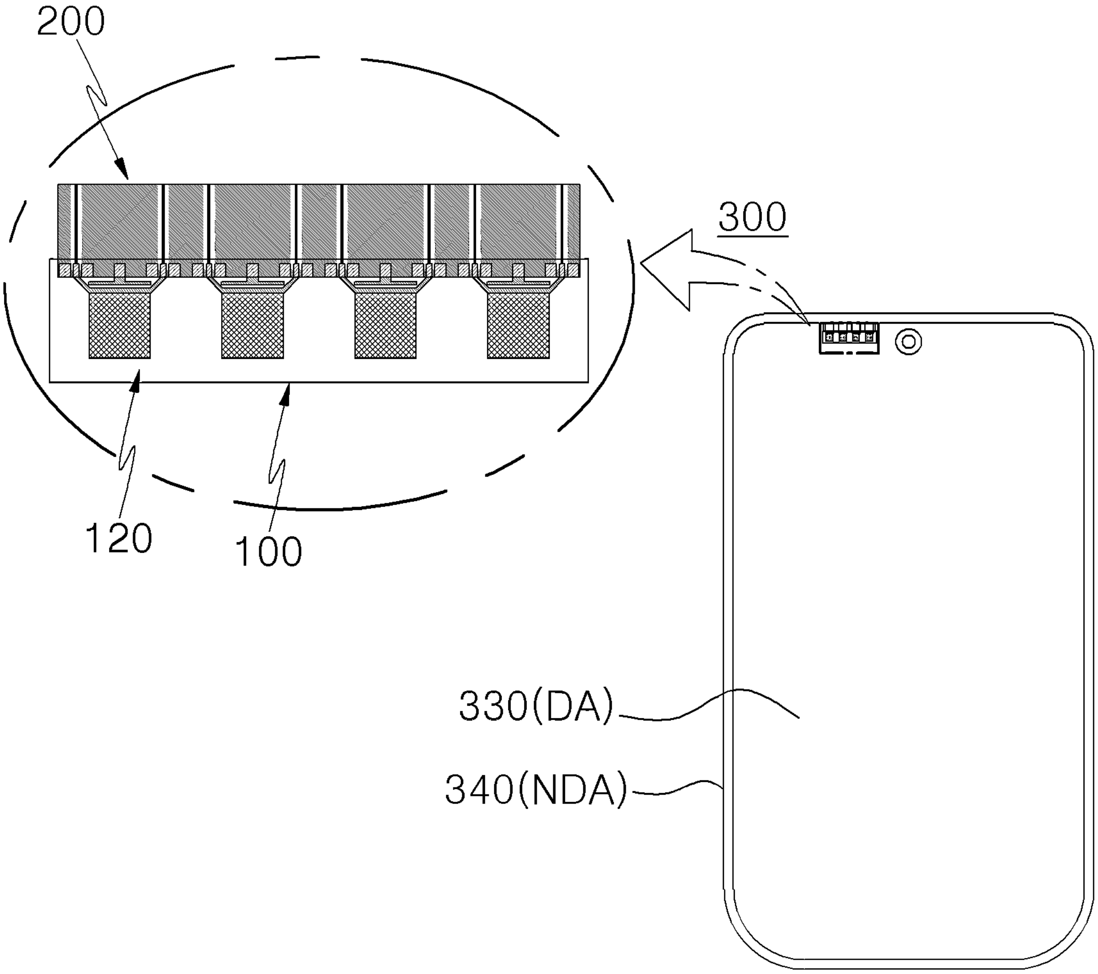
FIGS. 8 and 9 are a schematic plan view and a cross-sectional view, respectively, illustrating an image display device in accordance with example embodiments.
Figure 9:
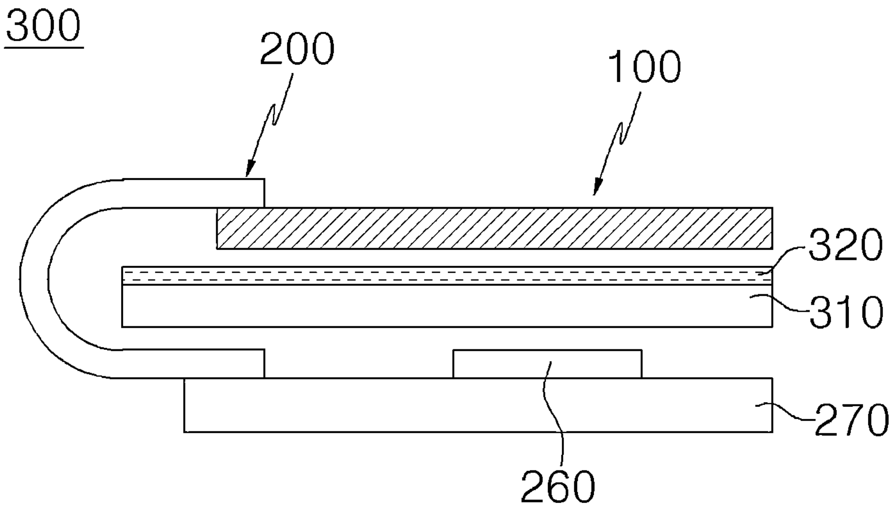

FIGS. 8 and 9 are a schematic plan view and a cross-sectional view, respectively, illustrating an image display device in accordance with example embodiments.

FIG. 8 illustrates a front portion or a window surface of the image display device 300. The front portion of the image display device 300 may include the display area (DA) 330 and the non-display area (NDA) 340. The non-display area 340 may correspond to, e.g., a light-shielding portion or a bezel portion of the image display device 300.

The antenna device 100 according to exemplary embodiments may be disposed toward a front surface of the image display device 300, and may be disposed on, e.g., on a display panel.

In some embodiments, the antenna device 100 may be attached to the display panel in the form of a film.

In an embodiment, the antenna device 100 may be formed over the display area 330 and the non-display area 340 of the image display device 300. In an embodiment, the radiator 122 may at least partially overlap the display area 330.

As described above, the transmission line 124, the auxiliary radiator 123, the signal pad 126, the ground pad 128 and the connection pad 129 may overlap the non-display area 340 in a thickness direction. For example, a portion of the antenna unit 120 having the solid structure may overlap the non-display area 340.

In some embodiments, the antenna device 100 may be located in a central portion of one side of the image display device 300. Accordingly, deterioration of a radiation performance at either end of the one side may be prevented.

The antenna device 100 may be fed or driven through the circuit board 200.

An antenna driving IC chip 260 may be mounted on the circuit board 200. As illustrated in FIG. 9, an intermediate circuit board 270 such as a rigid printed circuit board may be disposed between the circuit board 200 and the antenna driving IC chip 260. In an embodiment, the antenna driving IC chip 260 may be directly mounted on the circuit board 200.

Referring to FIG. 9, the image display device 300 may include a display panel 310 and the above-described antenna device 100 disposed on the display panel 310.

In example embodiments, an optical layer 320 may be further included on the display panel 310. For example, the optical layer 320 may be a polarizing layer including a polarizer or a polarizing plate.

The circuit board 200 (e.g., a flexible printed circuit board) may be bent along a lateral bending profile of the display panel 310 and disposed at the rear portion of the image display device 300, and may extend toward the intermediate circuit board 270 (e.g., a main board) on which the antenna driving IC chip 260 is mounted.

The circuit board 200 and the intermediate circuit board 270 may be bonded or interconnected through a connector, so that feeding and antenna driving control to the antenna device 100 may be performed by the antenna driving IC chip 260.

Hereinafter, preferable examples are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Conductive lines including copper (Cu) were patterned on a multi-layered COP dielectric layer (a first dielectric layer and a third dielectric layer) as illustrated in FIG. 1, and a COP dielectric layer (a second dielectric layer) was formed on the conductive lines to obtain an antenna device.

A line width of the conductive lines was 2 μm and the thickness was 0.5 μm.

A resonance frequency of the antenna unit was adjusted to have a dual band of about 28 GHz and about 39 GHz.

Example 2

An antenna device was manufactured by the same method as that in Example 1, except that conductive lines including copper were patterned in a shape as illustrated in FIG. 2.

Comparative Example

Figure 10:
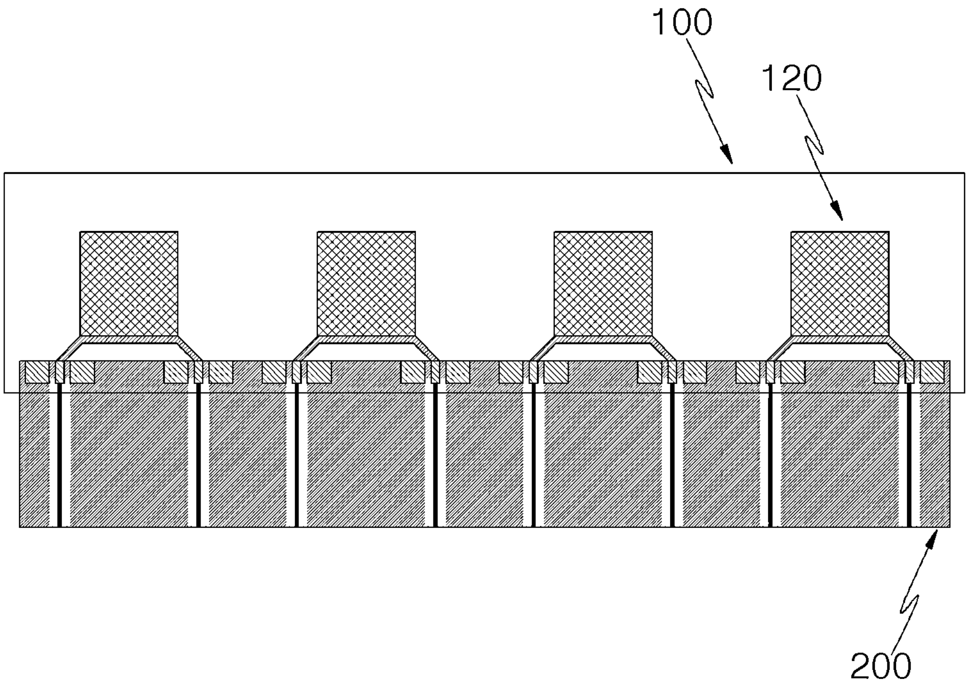
FIG. 10 is a schematic plan view illustrating an antenna structure in accordance with Comparative Example.

FIG. 10 is a schematic plan view illustrating an antenna structure in accordance with Comparative Example.

As illustrated in FIG. 10, an antenna device was manufactured by the same method as that in Example 1 except that an auxiliary radiator was not formed.

Experimental Example (1) Measurement of Antenna Gain and 2D Radiation Pattern Radiation patterns representing antenna gains and beam waveforms of radiators of the antenna devices manufactured according to Examples and Comparative Example were confirmed using an HFSS simulator (Ansys Co., Ltd.).

FIGS. 11A to 11F show graphs of 2D radiation patterns of antenna devices of Examples and Comparative Example.

Figure 11A:
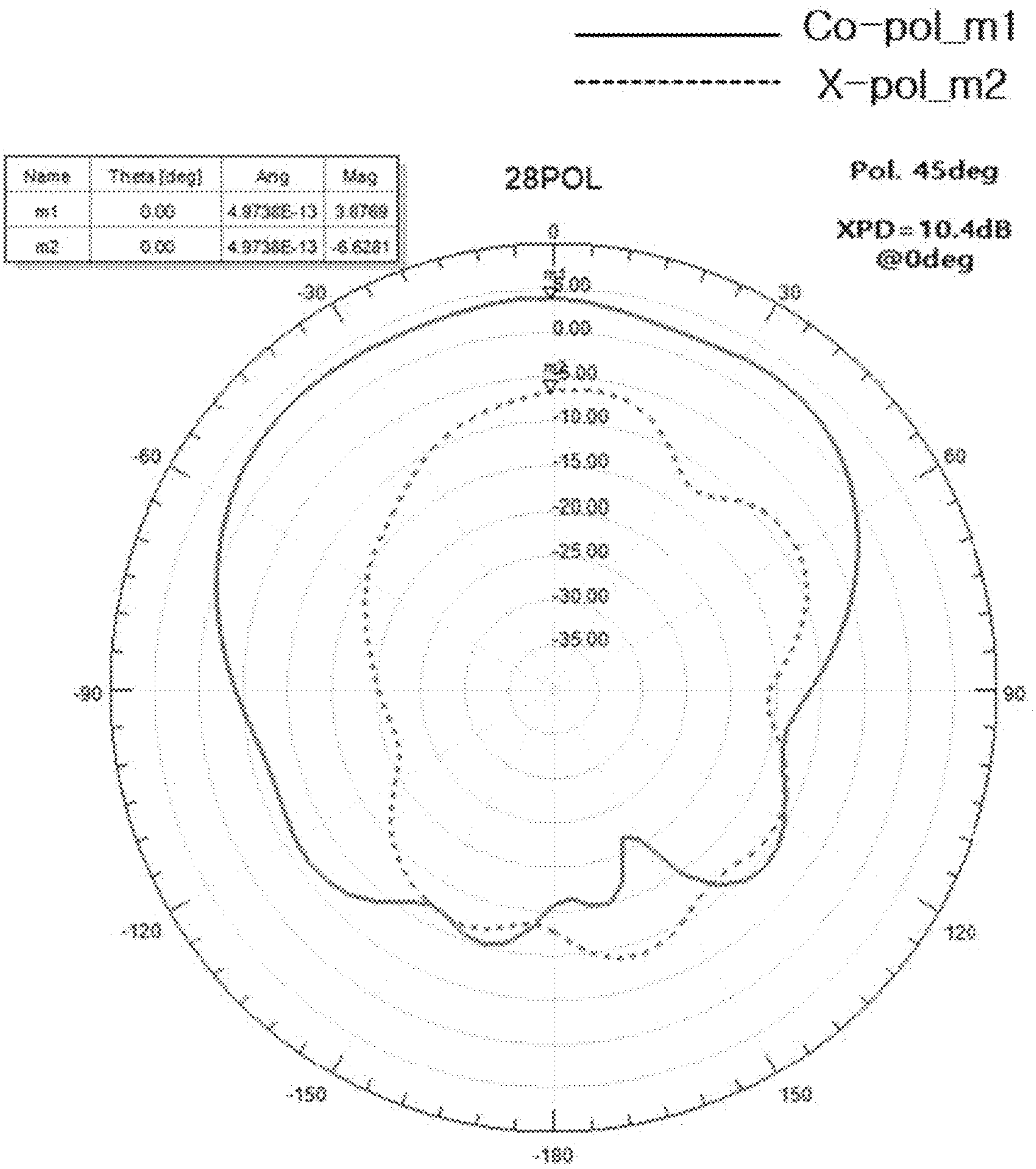
FIGS. 11A to 11F show graphs of 2D radiation patterns of antenna devices of Examples 1 and 2 and Comparative Example.
Figure 11B:
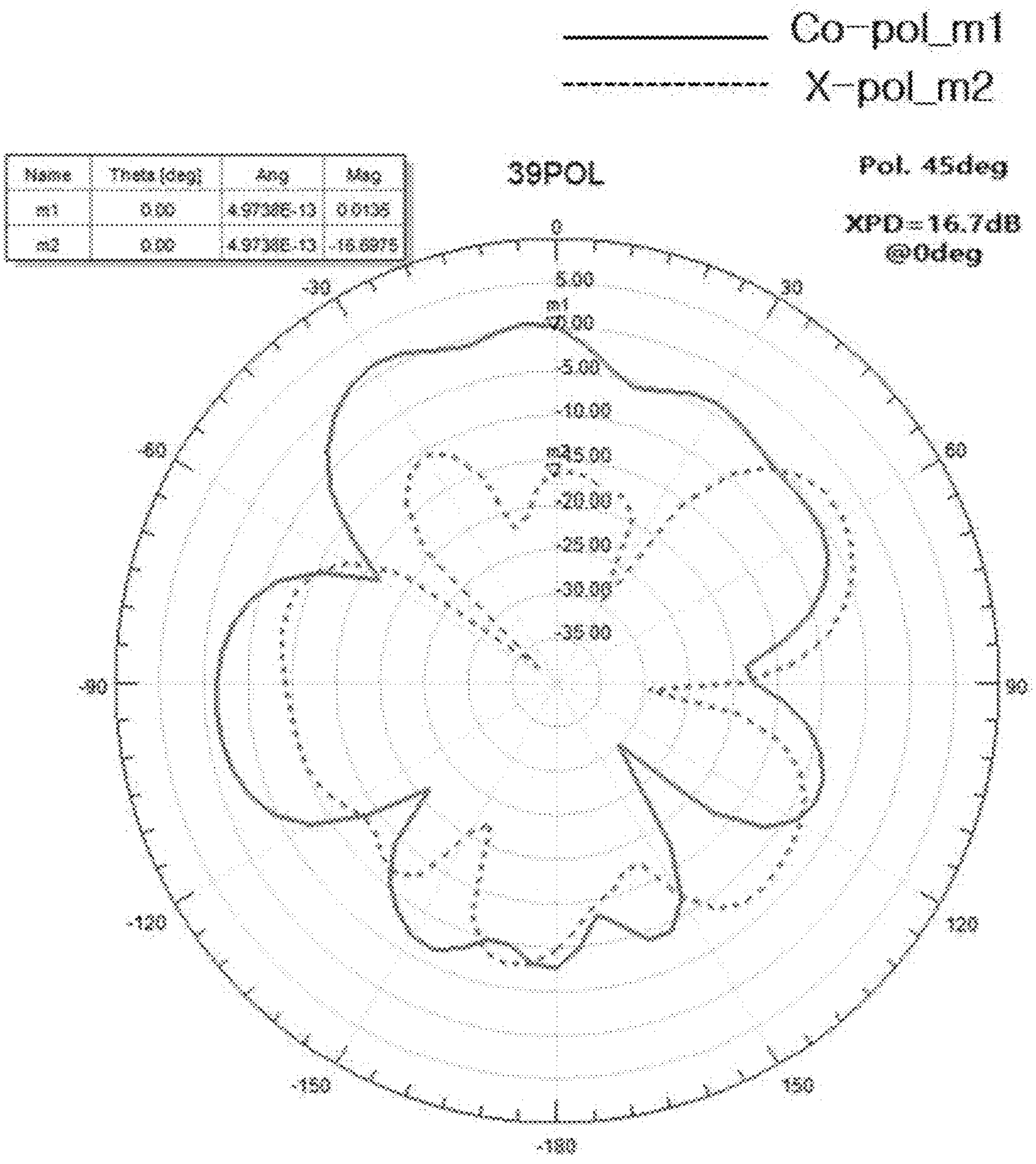
Figure 11C:
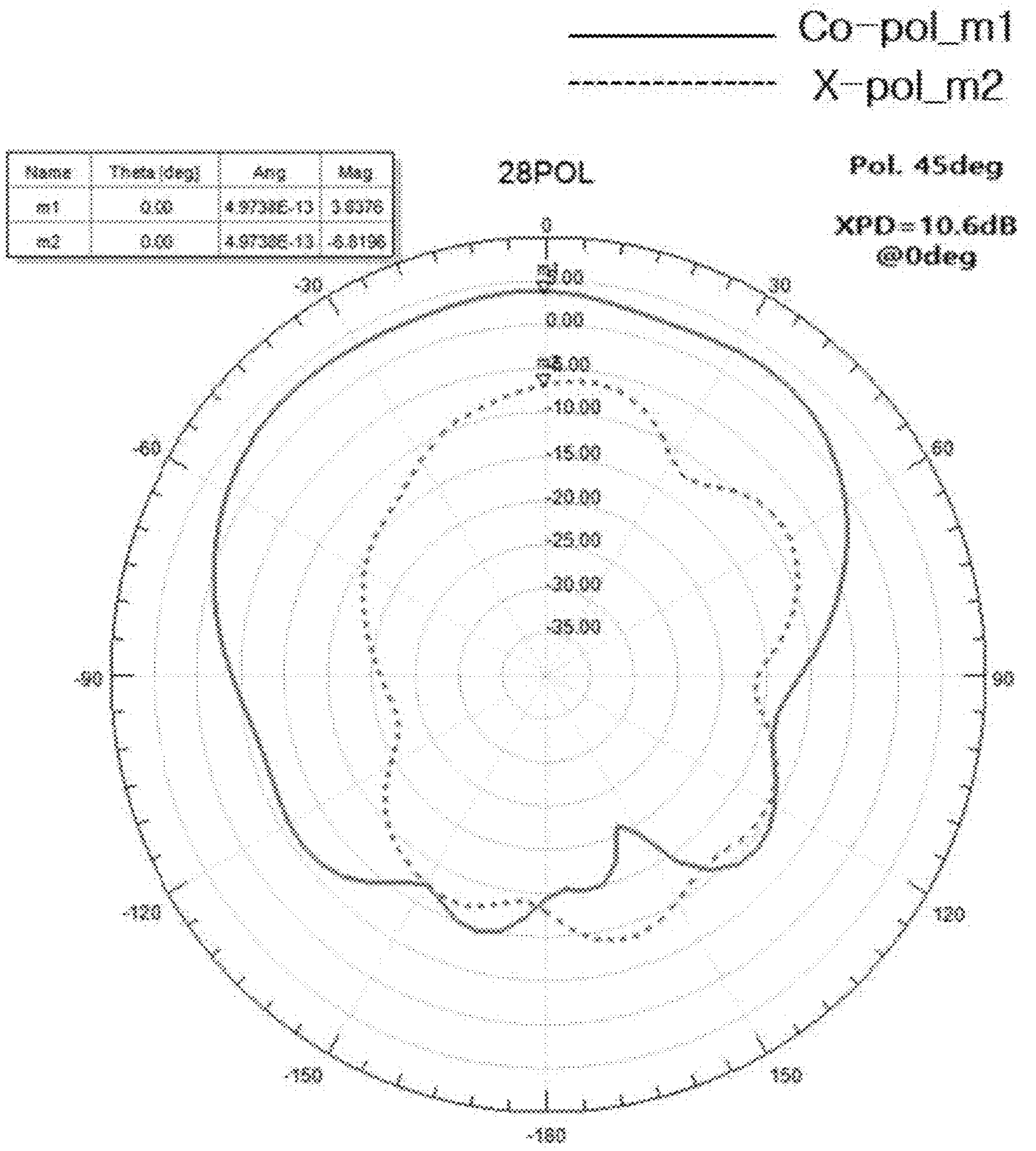
Figure 11D:
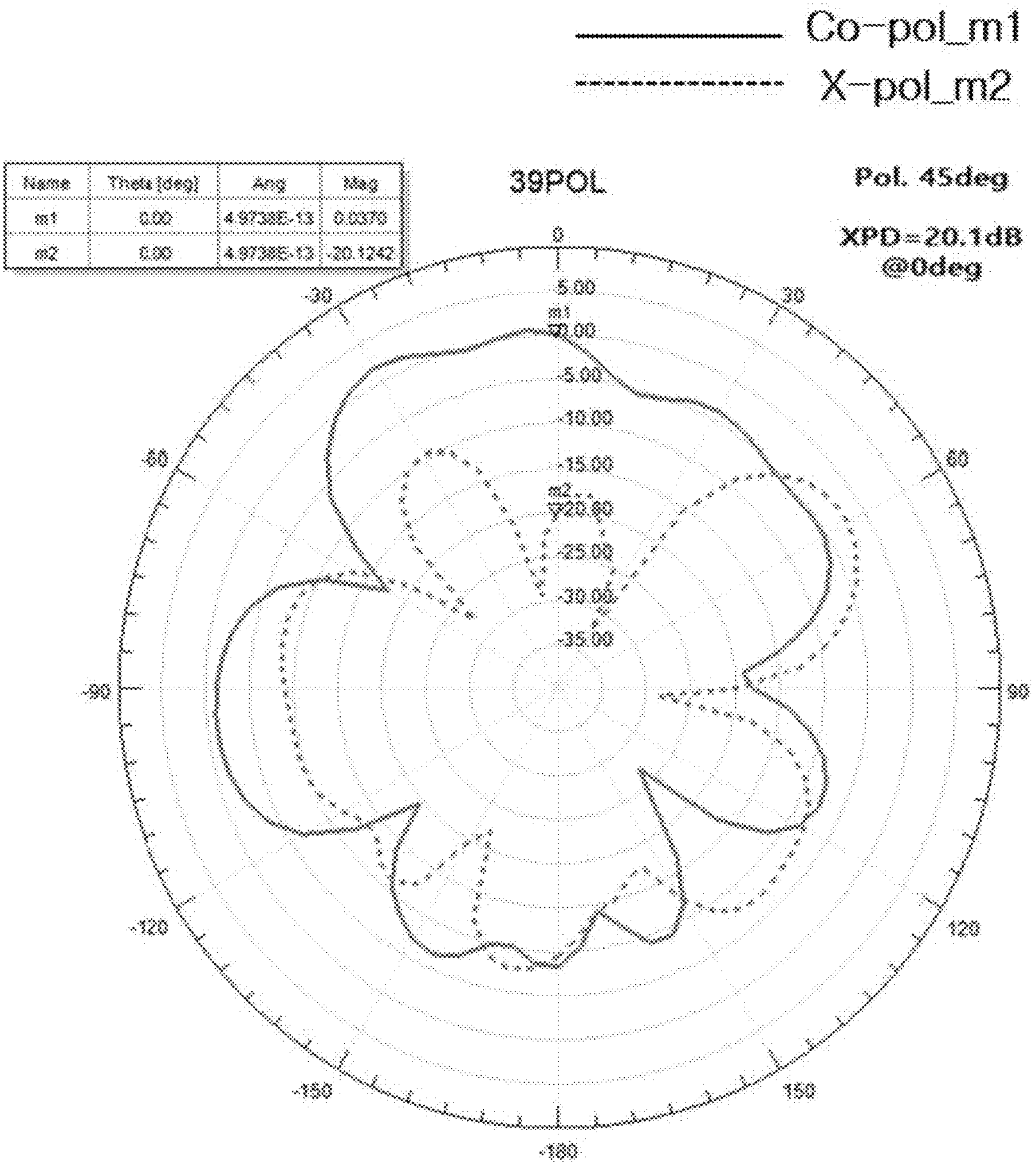
Figure 11E:
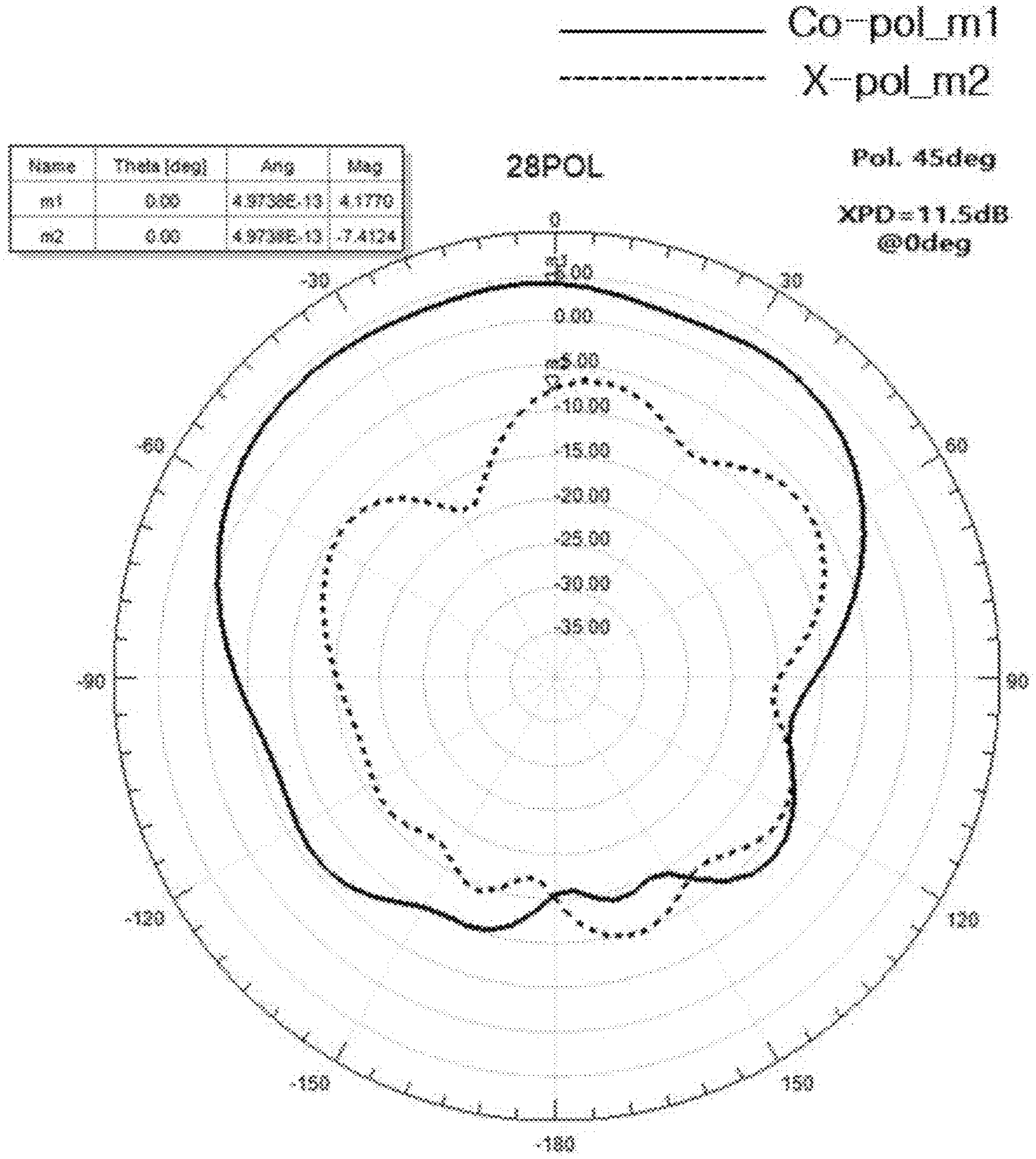
Figure 11F:
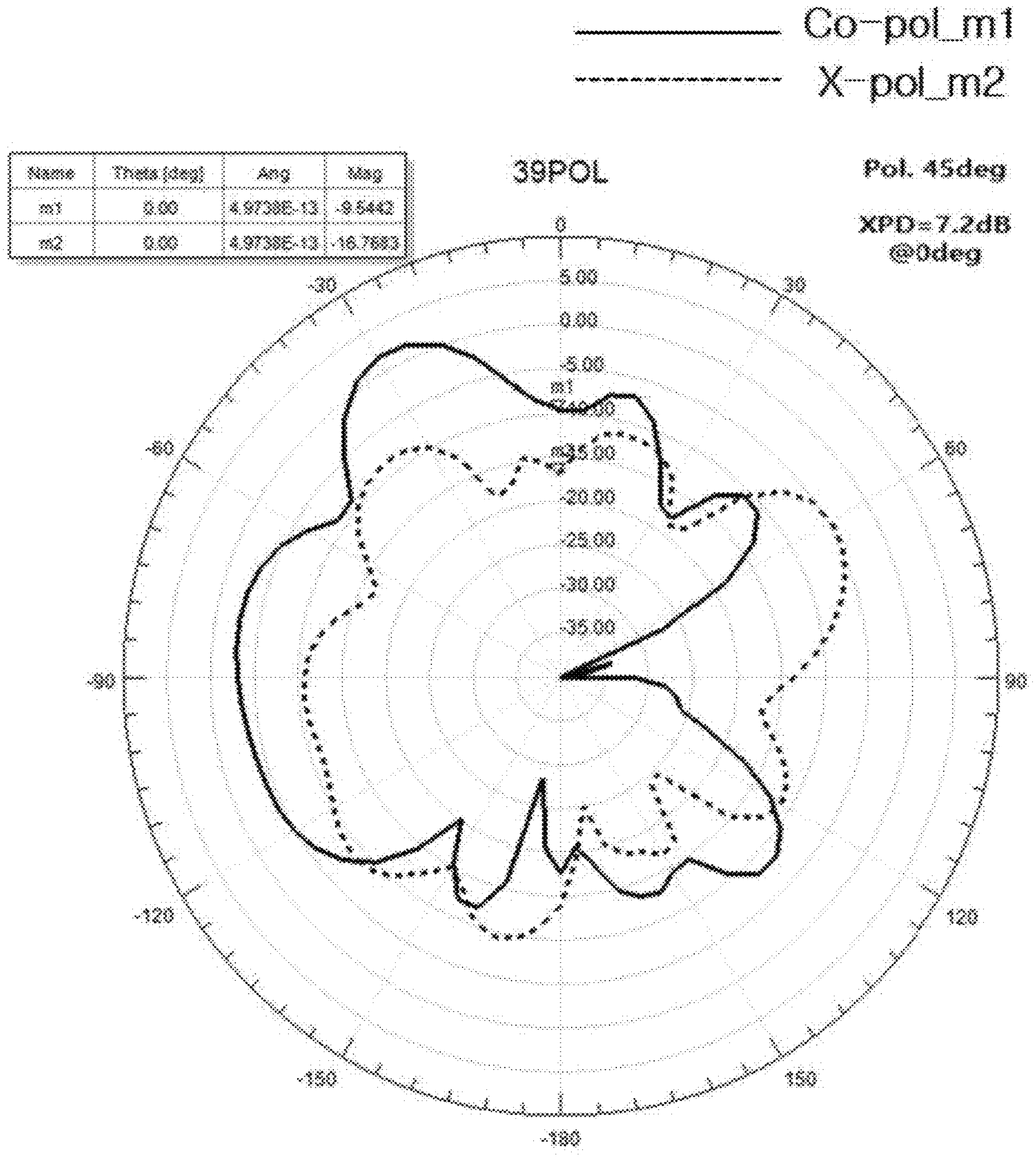

FIGS. 11A and 11B are graphs of 2D radiation patterns of the antenna device of Example 1. FIGS. 11C and 11D are graphs of 2D radiation patterns of the antenna device of Example 2. FIGS. 11E and 11F are graphs of 2D radiation patterns of the antenna device of Comparative Example.

Specifically, FIGS. 11A, 11C and 11E are graphs of 2D radiation patterns in a 28 GHz frequency band. FIGS. 11B, 11D, and 11F are graphs of 2D radiation patterns in a 39 GHz frequency band.

In FIGS. 11A to 11F, if a difference in a signal strength (cross polarization discrimination: XPD) between a Co-polarization (Co-pol) and a Cross-polarization (X-pol) is 10 dB or more, it can be evaluated that dual-polarization radiation is sufficiently implemented in the corresponding frequency band.

The XPDs according to the frequency bands of Examples and Comparative Example are shown in Table 1 below.

TABLE 1

| | XPD(dB)_28 GHz | XPD(dB)_39 GHz |
|---|---|---|
| Example 1 | 10.4 | 16.7 |
| Example 2 | 10.6 | 20.1 |
| Comparative Example | 11.5 | 7.2 |

Referring to FIGS. 11A to 11F and Table 1, in Examples 1 and 2, the XPDs in both the 28 GHz frequency band and the 39 GHz frequency band were 10 dB or more. In Comparative Example, the XPD in the 39 GHz frequency band was less than 10 dB.

Thus, the antenna devices of Examples 1 and 2 were conformed as a dual band-dual polarization antenna device operable in the 28 GHz and 39 GHz frequency bands. However, the antenna device of Comparative Example was confirmed as a single-band antenna device that was not operable in the 39 GHz frequency band due to the omission of the auxiliary radiator.

(2) Measurement of Return Loss, Isolation and Antenna Gain

A return loss, an isolation and an antenna gain according to frequencies were measured/confirmed by connecting a port to the signal pad of each antenna device manufactured according to embodiments and comparative examples.

E5080B ENA Network Analyzer was used as a measurement apparatus, and HESS simulation was used as a simulator.

Figure 12:
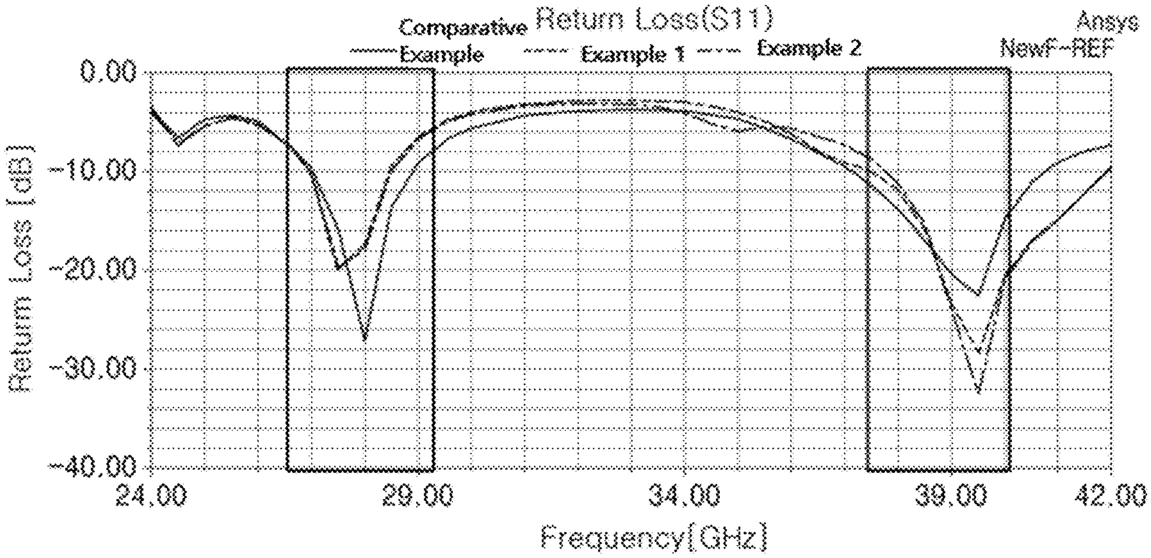
FIG. 12 is a graph showing a return loss according to frequencies in Examples and Comparative Examples.
Figure 13:
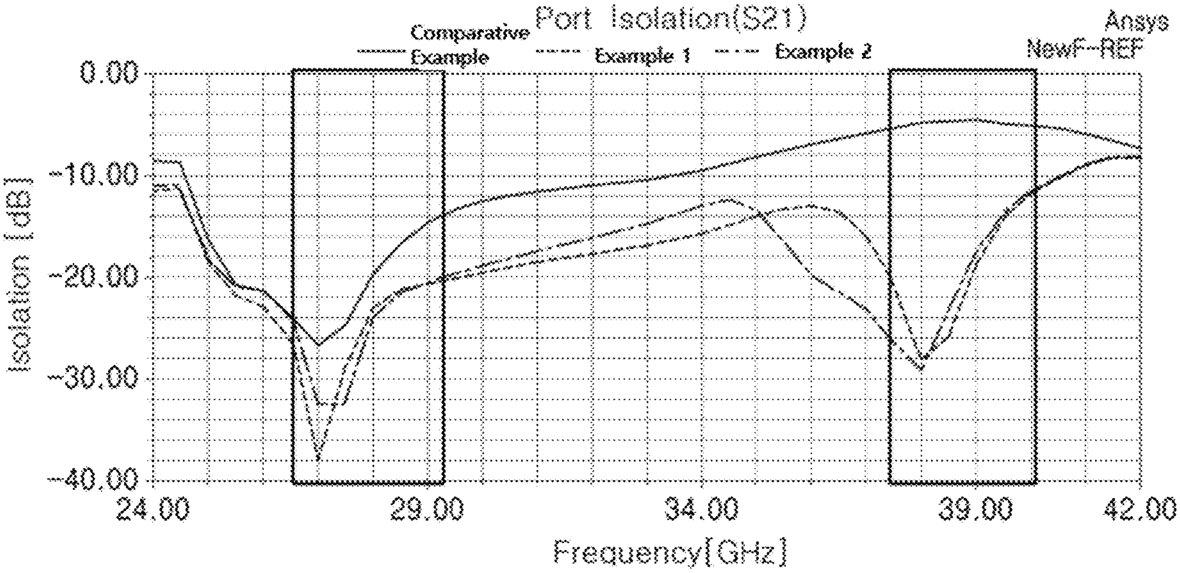
FIG. 13 is a graph illustrating an isolation according to frequencies in Examples and Comparative Example.
Figure 14:
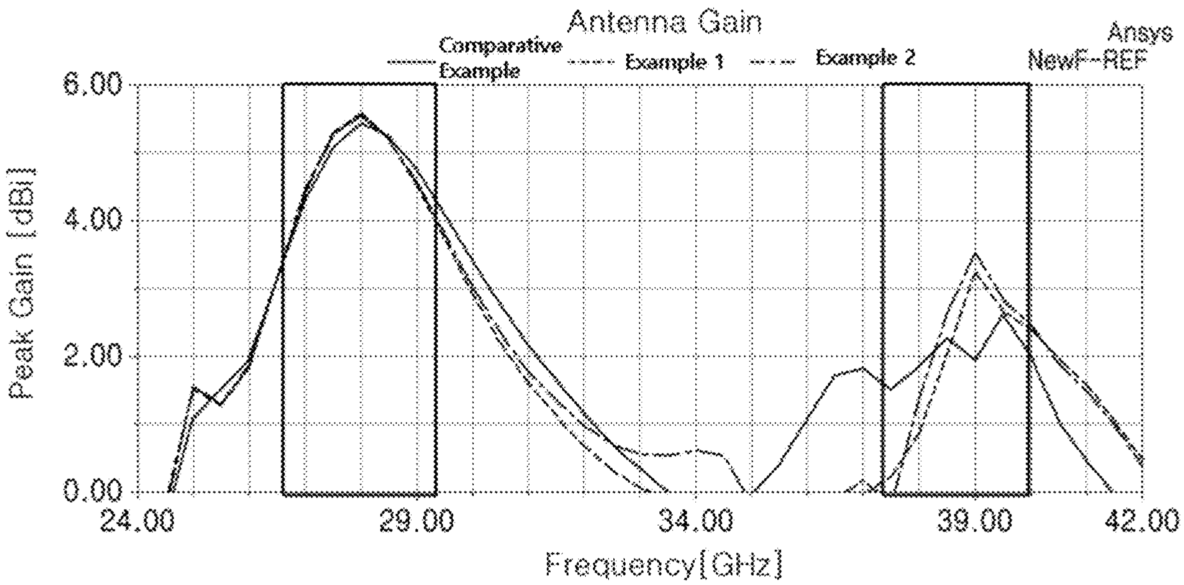
FIG. 14 is a graph showing an antenna gain according to frequencies of Examples and Comparative Example.

FIG. 12 is a graph showing a return loss according to frequencies in Examples and Comparative Examples. FIG. 13 is a graph illustrating an isolation according to frequencies in Examples and Comparative Example. FIG. 14 is a graph showing an antenna gain according to frequencies of Examples and Comparative Example.

Referring to FIGS. 12 to 14, in Examples, the return loss, the isolation and the antenna gain were generally improved in the 28 GHz band and 39 GHz band (double band radiation). In Comparative Example, the reflection loss, the isolation and the antenna gain were less in the 39 GHz band than those from Examples (single band radiation).

What is claimed is:

1. An antenna device comprising:

a radiator;

a transmission line connected to the radiator, the transmission line including a first transmission line and a second transmission line facing each other; and an auxiliary radiator disposed between the first transmission line and the second transmission line to be spaced apart from the radiator, wherein the auxiliary radiator comprises an extension portion parallel to a lower side of the radiator, and a connection portion branching from the extension portion and extending in a direction perpendicular to the extension portion.

2. The antenna device according to claim 1, wherein the first transmission line and the second transmission line are connected to both lateral ends of a lower side of the radiator.

3. The antenna device according to claim 1, wherein the first transmission line and the second transmission line extend in different directions from the radiator.

4. The antenna device according to claim 1, wherein an extension direction of the first transmission line and an extension direction of the second transmission line are symmetrical with respect to an extension direction of the connection portion.

5. The antenna device according to claim 1, wherein the auxiliary radiator comprises a first auxiliary radiator and a second auxiliary radiator facing each other.

6. The antenna device according to claim 5, the first auxiliary radiator comprises a first extension portion parallel to a lower side of the radiator, and a first connection portion extending in a direction perpendicular to the first extension portion from an end portion of the first extension portion, and the second auxiliary radiator comprises a second extension portion spaced apart from the first extension portion and parallel to the lower side of the radiator, and a second connection portion extending in a direction perpendicular to the second extension portion from an end portion of the second extension portion.

7. The antenna device according to claim 5, wherein the first auxiliary radiator and the second auxiliary radiator have a symmetrical shape with respect to a virtual line passing through a center of the radiator in a length direction.

8. The antenna device according to claim 1, wherein the radiator includes a mesh structure, and the transmission line and the auxiliary radiator include a solid structure.

9. An antenna structure comprising:

the antenna device of claim 1; and a circuit board electrically connected to the antenna device.

10. The antenna structure according to claim 9, wherein the circuit board comprises a core layer, and signal wirings arranged on one surface of the core layer and connected to the first transmission line and the second transmission line.

11. The antenna structure according to claim 10, wherein the circuit board further comprises a first ground arranged at the same layer as that of the signal wiring and disposed around the signal wiring to be spaced apart from the signal wiring.

12. The antenna structure according to claim 11, wherein the auxiliary radiator is connected to the first ground.

13. The antenna structure according to claim 10, wherein the circuit board further comprises a second ground arranged on the other surface opposing the one surface of the core layer.

14. The antenna structure according to claim 10, wherein the antenna device further comprises a signal pad connected to the transmission line and bonded to the signal wiring.

15. The antenna structure according to claim 14, wherein the antenna device further comprises a ground pad arranged around the signal pad to be spaced apart from the signal pad.

16. An image display device comprising:

the antenna structure of claim 9; and a display panel connected to the antenna structure.

* * * * *